United States Patent
Welschof et al.

(10) Patent No.: US 8,920,277 B2
(45) Date of Patent: Dec. 30, 2014

(54) HYDROMECHANICAL TRANSMISSION WITH A HYDRAULIC MOTOR AND A MECHANICAL MULTI-STEP VARIABLE SPEED TRANSMISSION

(75) Inventors: Bernward Welschof, Großostheim (DE); Ulrich Schwarz, Aschaffenburg (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 241 days.

(21) Appl. No.: 13/422,020

(22) Filed: Mar. 16, 2012

(65) Prior Publication Data
US 2012/0240724 A1 Sep. 27, 2012

(30) Foreign Application Priority Data

Mar. 21, 2011 (DE) .......................... 10 2011 014 589

(51) Int. Cl.
*F16H 47/04* (2006.01)
*B60K 17/356* (2006.01)
*F16H 3/54* (2006.01)
*F16H 57/02* (2012.01)
*F16H 57/00* (2012.01)

(52) U.S. Cl.
CPC ................. B60K 17/356 (2013.01); *F16H 3/54* (2013.01); *B60Y 2410/10* (2013.01); *B60Y 2400/4244* (2013.01); *B60Y 2200/22* (2013.01); *F16H 2057/02086* (2013.01); *B60Y 2304/072* (2013.01); *B60Y 2400/73* (2013.01); *F16H 2057/005* (2013.01)
USPC .......................................................... 475/83

(58) Field of Classification Search
CPC ............ F16H 3/44; F16H 39/04; F16H 47/04
USPC ...................... 475/31, 83, 116, 317
See application file for complete search history.

(56) References Cited

U.S. PATENT DOCUMENTS

| 5,397,281 A | 3/1995 | Forster | |
|---|---|---|---|
| 2002/0010048 A1* | 1/2002 | Ito et al. | 475/83 |
| 2006/0025268 A1* | 2/2006 | Chang et al. | 475/83 |

FOREIGN PATENT DOCUMENTS

| DE | 4206100 A1 | 9/1993 |
|---|---|---|
| EP | 0128104 A1 | 12/1984 |
| EP | 1231413 A2 | 8/2002 |

* cited by examiner

*Primary Examiner* — Edwin A Young
(74) *Attorney, Agent, or Firm* — The Webb Law Firm

(57) ABSTRACT

A hydromechanical transmission has a hydraulic pump-driven hydraulic motor of a hydrostatic continuously variable transmission and a mechanical multi-step variable speed transmission connected to a drive shaft of the hydraulic motor, which can be shifted into operation by a gear shifting device. In order to adapt the hydromechanical transmission with as compact as possible a design to diverse installation cases with little effort, the gear shifting device is arranged directly adjacent to the hydraulic motor and is consolidated with the latter into a preassembled constructional unit.

51 Claims, 9 Drawing Sheets

HYDROMECHANICAL TRANSMISSION WITH A HYDRAULIC MOTOR AND A MECHANICAL MULTI-STEP VARIABLE SPEED TRANSMISSION

CROSS REFERENCE TO RELATED APPLICATION

This application claims priority to German application DE 102011014589.3, filed Mar. 21, 2011, which is herein incorporated by reference in its entirety.

BACKGROUND OF THE INVENTION

1. Field of the Invention

The invention relates to a hydromechanical transmission with a hydraulic pump-driven hydraulic motor of a hydrostatic continuously variable transmission and a mechanical multi-step variable speed transmission connected to a drive shaft of the hydraulic motor, which can be shifted into operation by a gear shifting device.

2. Technical Considerations

A generic hydromechanical transmission is described in EP 1 231 413 A2 and can be used in mobile work machines, such as telehandlers and also construction and harvesting machinery. Owing to the two-step configuration of the multi-step variable speed transmission, it is possible to shift to and from a working gear and a road gear and, in contrast to so-called geared-neutral transmissions, it is possible to do so in operation, i.e., while the work machine is being driven. In the road gear, driving speeds of 40 km/hr and more are achievable for reaching a worksite of the work machine as quickly as possible. In the working gear of the multi-step variable speed transmission, i.e., at slow driving speeds of a work machine equipped with the hydromechanical transmission, as a general rule the continuously variable gear ratio range of the hydrostatic continuously variable transmission (CVT) suffices and does not require any additional gear ratio spread.

In order to be able to shift in operation, i.e., while driving, with a hydromechanical transmission with switching gear teeth in the multi-step variable speed transmission, provision is made of electrohydraulic synchronization. Changing the gear ratio in the CVT brings about a rotation speed adjustment corresponding to the step change in the multi-step variable speed transmission. Although the traction force in the multi-step variable speed transmission is briefly interrupted during the shifting operation, this has no negative impact during a road drive.

If the multi-step variable speed transmission is configured as a power shift transmission, then multi-plate clutches ensure shifting to and from the working gear and the road gear without interruption of the traction force. The shifting operation in such a multi-step variable speed transmission can be further assisted by shifting the gear ratio in the CVT toward a synchronization speed.

In the hydromechanical transmission of EP 1 231 413 A2, which is configured as a spur gear train and equipped with switching gear teeth, use is made of a hydraulic motor configured as a bent-axis motor, which is inserted in a transmission case of the multi-step variable speed transmission. An input shaft of the multi-step variable speed transmission engages with the gear teeth of a drive shaft of the hydraulic motor. The transmission input shaft is supported in a transmission case on one end and on the drive shaft of the hydraulic motor on the other. The gear shifting device of the multi-step variable speed transmission is associated with the multi-step variable speed transmission. A shift sleeve with an actuator lever and a hydraulic shift cylinder with electromagnetically actuable shift valves thus constitute integral components of the multi-step variable speed transmission.

As the CVT and the multi-step variable speed transmission in hydromechanical transmissions are often made by different manufacturers, extensive engineering measures are required in order to adapt the performance of the hydrostatic CVT and the shifting forces and shifting travels in the multi-step variable speed transmission to one another so that, given the characteristics and operating performance of the CVT, trouble-free shifting in the sense of an optimal shifting operation in the multi-step variable speed transmission is possible.

A change of manufacturers of the multi-step variable speed transmission entails an additional workload for the manufacturer of the CVT (who as a general rule is responsible for the entire system), because the gear shifting device operatively connected to the CVT is generally different from the previous one. It is therefore necessary to provide a gear shifting device suitably adapted to the CVT for each transmission combination, which disadvantageously leads to a high level of variance. Furthermore, this variance limits the design freedom in terms of optimizing the dimensions of the hydromechanical transmission.

Therefore it is an object of the present invention to provide a hydromechanical transmission of the generally aforesaid type but with a compact design that is readily adaptable to diverse installation cases.

SUMMARY OF THE INVENTION

This object is achieved according to the invention by arranging the gear shifting device directly adjacent to the hydraulic motor and consolidating it with the latter into a preassembled constructional unit.

In the present case, the idea of the invention lies in functionally associating the gear shifting device of the multi-step variable speed transmission, which must be actuated in accordance with the setting of the hydrostatic CVT, with the hydraulic motor. Hence the gear shifting device is in principle an integral component of the hydraulic motor. The shifting forces and the shifting travels can therefore be designed along the lines of a standard shifting concept and it is then possible to make do with only a few variants.

Hence, the multi-step variable speed transmission can be considerably simpler in design than was formerly possible. Thanks to the simplified transmission design, fewer constructional adaptations are required in the event of change in manufacturer and thus a change in design of the multi-step variable speed transmission as well. As for the shifting operation in the multi-step variable speed transmission, in which the CVT and the gear shifting device of the multi-step variable speed transmission (especially when configured with electrohydraulic synchronization) must interact as effectively as possible, as a result of the combination of the hydraulic motor with the gear shifting device according to the invention, the transmission expertise and the responsibility for the shift function now lie in the hands of only one manufacturer, namely the manufacturer of the hydraulic motor or of the CVT.

The gear shifting device is arranged sparingly with regard to space in an advantageous manner in the area of an axial section of the drive shaft, which projects from a drive shaft area that is axially delimited by two drive shaft bearings arranged at a distance from one another.

Adjoining this area is the multi-step variable speed transmission, the gear steps of which are engaged and disengaged by means of the gear shifting device.

In an embodiment of the invention, the gear shifting device is hydraulically actuable and held on the hydraulic motor. The arrangement according to the invention of the gear shifting device directly adjacent to the hydraulic motor turns out to be particularly advantageous in that provision of the hydraulic connections in this area necessary for the hydraulic actuation of the gear shifting device requires only a minor effort. Moreover, fixing the gear shifting device on the hydraulic motor or on the structural elements thereof configured for this purpose, such as the motor housing or the drive shaft, enables the constructively simple consolidation of the gear shifting device with the hydraulic motor into a preassembled constructional unit.

The gear shifting device advantageously has at least one axially displaceable shift actuator, which is actuable by oil pressure prevailing in a pressure control space.

In order to pressurize the gear shifting device or the pressure control space with oil in an especially expedient manner, an advantageous embodiment of the invention proposes equipping the drive shaft with an axial channel, which is connected to the pressure control space of the gear shifting device on a transmission side end of the drive shaft.

In an advantageous embodiment of the invention, the axial channel adjoins a rotary feed-through on an end of the drive shaft remote from the transmission.

When the rotary feed-through has a rotationally fixed bushing that ends in a center bore adjoining the centrally arranged axial channel and formed in the support area of the drive shaft bearing remote from the transmission, there is little leakage in all operating modes. The impacts of a possible misalignment of the drive shaft and thus the center bore relative to the bushing that could occur as a result of a deflection of the drive shaft are thus minimized.

In view of a compact design and ideal operating performance of the hydromechanical transmission of the invention, it is expedient if the multi-step variable speed transmission and the hydraulic motor are consolidated with one another into a transmission unit. Such a transmission unit not only has a shifting performance in which the hydraulic motor, gear shifting device, and multi-step variable speed transmission are adapted to one another in the sense of a reliably functioning and smooth shifting operation, but it also constitutes a ready-to-install assembly that can be used in diverse work machines. The hydraulic motor thus becomes an actuator motor or a synchronous actuator motor.

The multi-step variable speed transmission can have a transmission case enclosing the gear shifting device.

It is also proposed that the multi-step variable speed transmission comprise a planetary gear train, particularly a one-step planetary gear train, that includes a sun gear, a planet carrier equipped with planet gears, and a ring gear. Two gear ratios are thus achievable with the smallest possible dimensions and the least effort, and this suffices for many application cases. The hydromechanical transmission of the invention is thus a compact transmission that needs little installation room.

It is advantageous if the sun gear of the planetary gear train is radially and axially supported on the drive shaft of the hydraulic motor. The sun gear in the multi-step variable speed transmission then no longer requires a separate bearing. Gear loads are absorbed by the drive shaft bearing.

A development of the invention proposes fixing the planet carrier to a transmission shaft of the multi-step variable speed transmission.

According to an embodiment of the invention, provision can be made of hydraulically pressurizable multi-plate clutches for torque transmission in the multi-step variable speed transmission. The use of multi-plate clutches enables the multi-step variable speed transmission to be configured as a power shift transmission in which speed synchronization prior to shifting need not take place. Also possible, however, is a use in a multi-step variable speed transmission configured as a synchronous transmission in which the rotation speeds are synchronized before changing gears and the multi-plate clutches serve exclusively for friction torque transmission rather than rotation speed adjustment.

In a development of the invention, provision is made of a multi-plate clutch that has plates alternatingly coupled with a rotationally fixed component and the ring gear of the planetary gear train.

In this context it is expedient if a clutch plate carrier is fixed or integrally formed on a motor housing of the hydraulic motor. The rotationally fixed component is therefore configured as a clutch plate carrier.

When provision is made of a spring mechanism for actuating a multi-plate clutch in the closing direction, a defined preferred state of the ring gear in a multi-plate clutch associated with the ring gear of the planetary drive arises with lacking or insufficient pressure of the hydraulic pressure medium, in which the ring gear is immobilized relative to the hydraulic motor.

Further provision is advantageously made of a multi-plate clutch having plates alternatingly coupled with the planet carrier and the sun gear. Here as well provision can be made of a spring mechanism for actuating the multi-plate clutch in the closing direction.

As an alternative to an embodiment of the multi-step variable speed transmission with torque transmitting clutch plates, it is proposed that provision be made of switching gear teeth for torque transmission in the multi-step variable speed transmission.

Switching gear teeth are advantageously formed on an axially displaceable shift sleeve coupled synchronously in rotation with the drive shaft of the hydraulic motor, the shift sleeve being displaceable by means of a shift actuator capable of being directly or indirectly actuated hydraulically.

The switching gear teeth of the shift sleeve are capable of meshing with switching gear teeth of the planet carrier. The shift actuator is equipped with switching gear teeth capable of meshing with switching gear teeth of the ring gear.

Three shifting positions are achievable by axial displacement of the shift actuator and thus the shift sleeve. In a first shifting position corresponding to neutral, neither the switching gear teeth of the shift sleeve nor those of the shift actuator are meshed with counter teeth.

In a second shifting position corresponding to the first or working gear, the shift actuator and the shift sleeve coupled therewith are axially displaced, by hydraulic pressurization of the former, into a position in which the switching gear teeth of the rotationally fixed shift actuator mesh with the switching gear teeth of the ring gear, whereas the switching gear teeth of the shift sleeve and those of the planet carrier are disengaged. The gear reduction step is thus effective in the planetary gear train.

In a third shifting position corresponding to the second or road gear, the shift actuator and the shift sleeve coupled therewith are axially displaced, by hydraulically pressurizing the former, into a position in which the switching gear teeth of the shift sleeve mesh with those of the planet carrier, whereas the switching gear teeth of the shift actuator and those of the ring gear are disengaged. The planetary gear train is thus shifted to through-drive.

For specific shifting positions, the shift actuator is operatively connected to an arresting bolt having annular grooves configured to engage with a spring-loaded detent ball.

For changing the shifting positions, with the aid of integrally formed control surfaces, the shift actuator can be directly actuated hydraulically by pressurization with oil. However, it is also possible for the shift actuator to be connected to an actuator piston of a hydraulic shift cylinder. This is a case of indirect pressurization, which has the advantage of allowing a more universal configuration of the shift actuator.

In connection with this embodiment of the invention, it turns out to be expedient if the aforesaid arresting bolt is connected to the actuator piston, e.g., integrated in the axial extension thereof. This results in a high level of integration and a compact design.

In an advantageous development of the invention, the actuator piston has a piston rod and a middle piston section enlarged in diameter, which on each of its end faces can be operatively connected to a stop bushing graduated in outer diameter and arranged in a step portion region of a cylinder bore of the shift cylinder, the step portion corresponding to the graduation. When shifting to and from the working gear and the road gear, a middle position of the actuator piston corresponding to neutral is thus always achieved first so that sufficient time remains for the hydrostatic CVT to establish a synchronization speed before the next gear is engaged.

When the transmission shaft of the multi-step variable speed transmission is connected to a gear on the input side of a downstream spur gear step of a transfer case, the hydromechanical transmission of the invention can serve as an installation kit in a splitter gearbox, in which it is inserted in the power flow between two drive axles for driving an all-wheel drive vehicle.

BRIEF DESCRIPTION OF THE DRAWINGS

Other advantages and details of the invention will be explained in more detail with reference to the illustrative embodiments shown schematically in the figures. Shown are.

DESCRIPTION OF THE PREFERRED EMBODIMENTS

Figure 1:
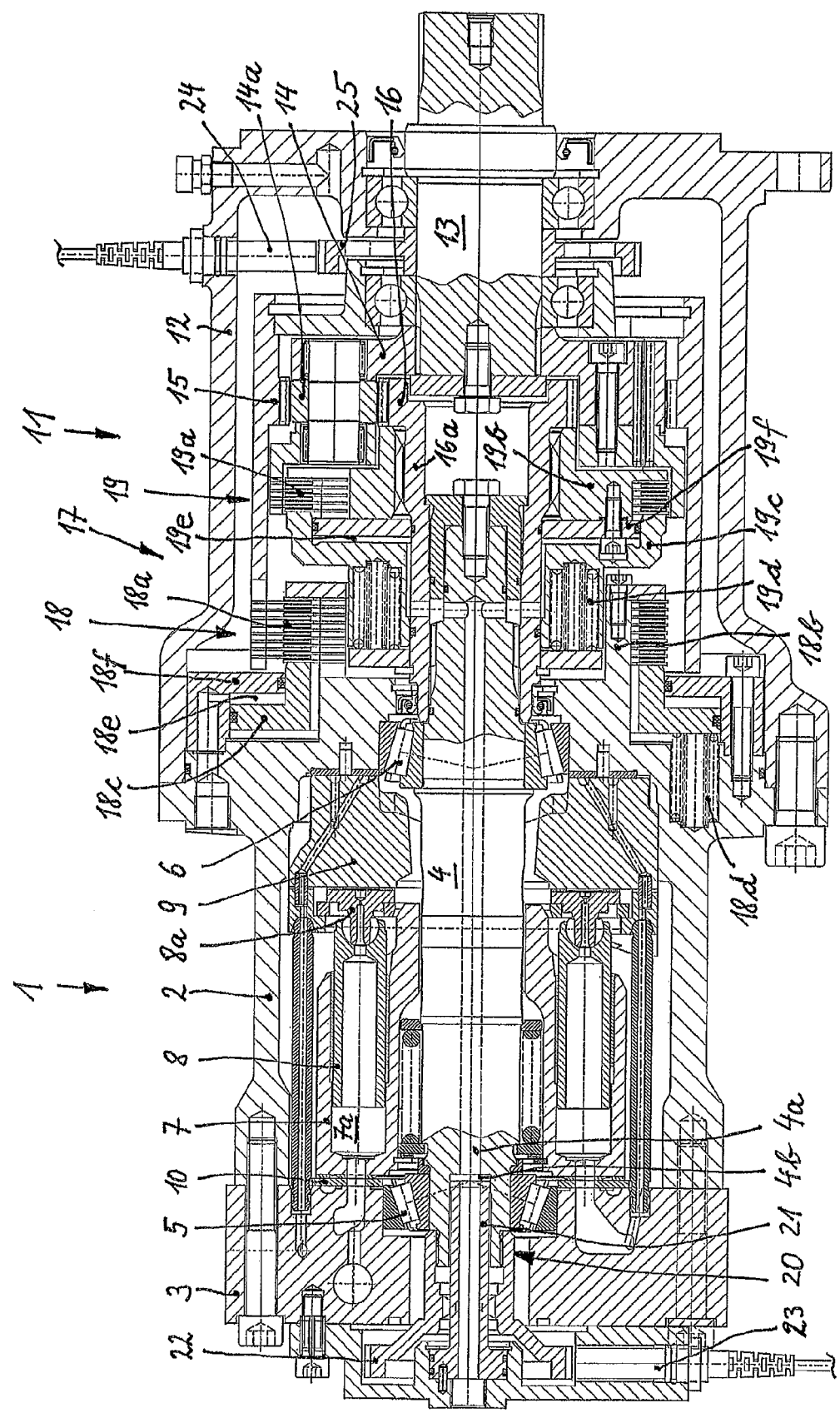
FIG. 1 is a longitudinal section through a hydromechanical transmission of the invention.

The hydromechanical transmission of the invention has a hydraulic motor 1, which in this illustrative embodiment is configured as an axial piston motor in swash plate design and which is hydraulically connected to a hydraulic pump (not shown). The hydraulic motor 1 is thus part of a hydrostatic continuously variable transmission (CVT).

The hydraulic motor 1 has a pot-shaped motor housing 2, which is capped by a motor cover 3 configured as a control plate mount. A drive shaft 4 is mounted in two drive shaft bearings 5, 6 axially spaced apart from each other (roller bearings configured as tapered roller bearings in this illustrative embodiment) in the motor housing 2 and in the motor cover 3 extending from the motor housing 2. A cylinder block 7 equipped with cylinder bores 7a is coupled in synchronized rotation, but axially-displaceable, with the drive shaft 4. Pressure-actuated working pistons 8 are axially displaceable in the cylinder bores 7a and are supported by glide shoes 8a on a movable cradle-shaped swash plate 9 in this illustrative embodiment. The cylinder block 7 rests on a disc-shaped control plate 10, which is held on the control plate mount, i.e., on the motor cover 3.

A multi-step variable speed transmission 11 designed to be driven by the hydraulic motor 1 has a pot-shaped transmission case 12, which is bolted to the motor housing 2. In the transmission case 12 is mounted a transmission shaft 13, which is connected to a planet carrier 14 of a planetary gear train (configured as a one-step planetary gear train in this embodiment) arranged inside the transmission case 12. Rotatably mounted on the planet carrier 14 are planet gears 14a, which mesh with a ring gear 15 of the planetary gear train. The planet gears 14a also mesh with a sun gear 16 that is integrally formed on a sleeve-shaped sun gear carrier 16a, which carrier 16a is connected in synchronous rotation to the drive shaft 4 of the hydraulic motor 1. The sun gear 16 is thus supported on the drive shaft 4, and radial and axial forces (resulting from, e.g., helical gearing) proceeding from the sun gear 16 are absorbed by the drive shaft bearings 5, 6.

In order to achieve the two possible gear ratios in a one-step planetary gear train with a driven sun gear 16, namely reduction with the ring gear 15 immobilized and output via the planet carrier 14 on the one hand, and through-drive with the ring gear 15 freely rotatable and the planet carrier 14 blocked relative to the sun gear 16 on the other, provision is made of a gear shifting device 17 directly adjacent to the hydraulic motor 1, which in this embodiment has a first multi-plate clutch 18 and a second multi-plate clutch 19. Obviously, it is also possible in principle to configure the multi-step variable speed transmission 11 with more than two gear ratios or shifting stages, for instance by means of an additional planetary gear train. In this case, the gear shifting device 17 needs to be adapted accordingly.

The gear shifting device 17 with the two multi-plate clutches 18, 19 is arranged in the area of an axial section of the drive shaft 4 located outside the motor housing 2, i.e., in an area that projects from a drive shaft area axially delimited by the two drive shaft bearings 5, 6 and which is arranged axially between the hydraulic motor 1 and the planetary gear train.

The first multi-plate clutch 18 is inserted between the ring gear 15 and the motor housing 2 and to this end it has clutch plates 18a that are alternatingly coupled with the ring gear 15 and a clutch plate carrier 18b connected to (in this illustrative embodiment integrally formed on) the motor housing 2. Provision is made of a hydraulically actuable, axially displaceable shift actuator 18c for engaging and disengaging the clutch plates 18a with/from one another. A spring mechanism 18d is effective in the engagement direction, i.e., toward the closed position, of the first multi-plate clutch 18. To open the first multi-plate clutch 18, the shift actuator 18c is hydraulically actuable against the spring force by the oil pressure prevailing in a pressure control space 18e arranged axially between the shift actuator 18c and an abutment plate 18f.

The second multi-plate clutch 19 is inserted between the planet carrier 14 and the sun gear 16 and to this end it has clutch plates 19a that are alternatingly coupled with the planet carrier 14 and a clutch plate carrier 19b connected in synchronous rotation to the sun gear 16 or to the sleeve-shaped sun gear carrier 16a (i.e., held on the drive shaft 4). The clutch plates 19a can be engaged with one another by an axially displaceable shift actuator 19c. A spring mechanism 19d is effective in the engagement direction, i.e., toward the closed position, of the second multi-plate clutch 19. To open the second multi-plate clutch 19, the shift actuator 19c is hydraulically actuable against the spring force by the oil pressure prevailing in a pressure control space 19e. The pressure control space 19e is arranged axially between the shift actuator 19c and an abutment plate 19f, which is bolted to the clutch plate carrier 19b in this illustrative embodiment.

For supplying pressurization medium, the pressure control space 19e is connected to a centrally aligned axial channel 4a formed in the drive shaft 4 of the hydraulic motor 1, which ends at a rotary feed-through 20 on the end of the drive shaft 4 remote from the transmission. The feed-through 20 has a rotationally fixed bushing 21, which ends in a center bore 4b adjoining the axial channel 4a and formed in the face of the drive shaft 4 remote from the transmission in the support area of the drive shaft bearing 5 remote from the transmission. A misalignment of the center bore 4b with the bushing 21, which can occur with a deflection of the drive shaft 4, thus has practically no impact on the seal of the rotary feed-through 20. Leakage is minimal.

The bushing 21 is located inside a rotation signal transmitter 22 rotating conjointly with the drive shaft 4, the signals of which are detected by a rotation speed sensor 23. Another rotation speed sensor 24 is located in the area of the transmission shaft 13 and interacts with a rotation signal transmitter 25 rotating conjointly with the transmission shaft 13. On the basis of the values for the input and output rotation speed of the hydromechanical transmission detected by the rotational speed sensors 23 and 24, a rotation speed adjustment prior to shifting in the multi-step variable speed transmission 11 is achievable by adjusting the gear ratio in the hydrostatic CVT. Owing to the presence of the multi-plate clutches 18, 19 in the gear shifting device 17, however, this is not compulsory, since the multi-plate clutches 18, 19 also enable shifting under power.

The gear shifting device 17 arranged directly adjacent to the hydraulic motor 1 together with the hydraulic motor 1 thus constitute a preassembled construction unit.

With insufficient oil pressure in the pressure control spaces 18e, 19e of the gear shifting device 17, under the effect of the two spring mechanisms 18d, 19d, the multi-step variable speed transmission 11 of the hydromechanical transmission illustrated in FIG. 1 is in an operation mode in which the two multi-plate clutches 18, 19 are closed and the multi-step variable speed transmission 11 is thus blocked in the manner of a parking brake.

Figure 2:
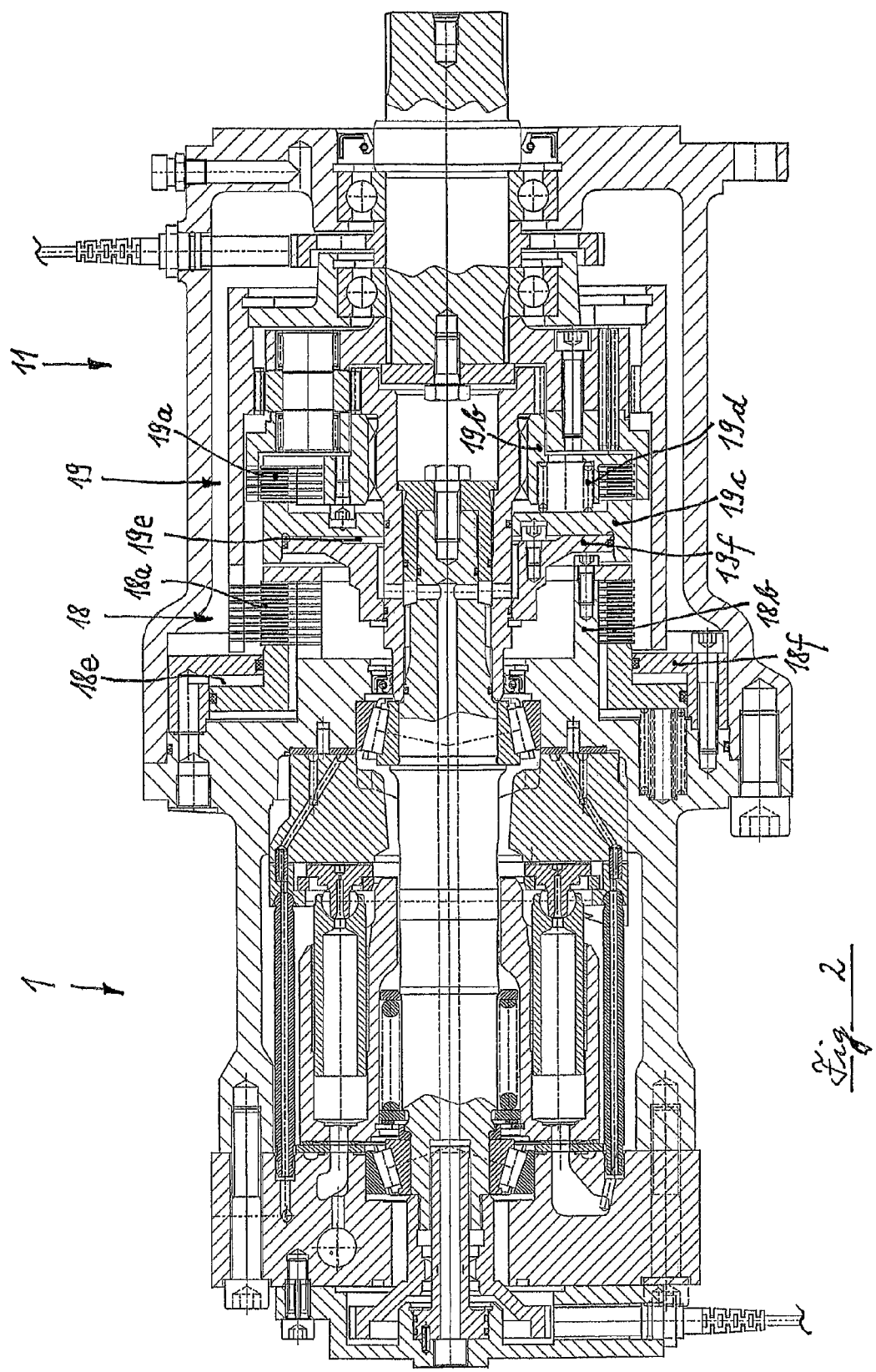
FIG. 2 is a longitudinal section through a first variant of a hydromechanical transmission of the invention.

In the variant of the hydromechanical transmission illustrated in FIG. 2, the spring mechanism 19d is effective on the second multi-plate clutch 19 in the opening rather than in the closing direction and thus has only a relatively minor spring force, which suffices when there is no oil pressure for moving the shift actuator 19c far enough so that the clutch plates 19a can rotate freely. The oil pressure in the pressure control space 19e is effective against the spring force in the closing direction. In this variant of embodiment, the shift actuator 19c is axially disposed between the clutch plates 19a and the abutment plate 19f and is secured against turning relative to the clutch plate carrier 19b and to the abutment plate 19f.

With lacking or insufficient oil pressure in the pressure control spaces 18e, 19e of the two multi-plate clutches 18, 19, the multi-step variable speed transmission 11 is in the "reduction" operating mode (i.e., in the first, or working gear).

Figure 3:
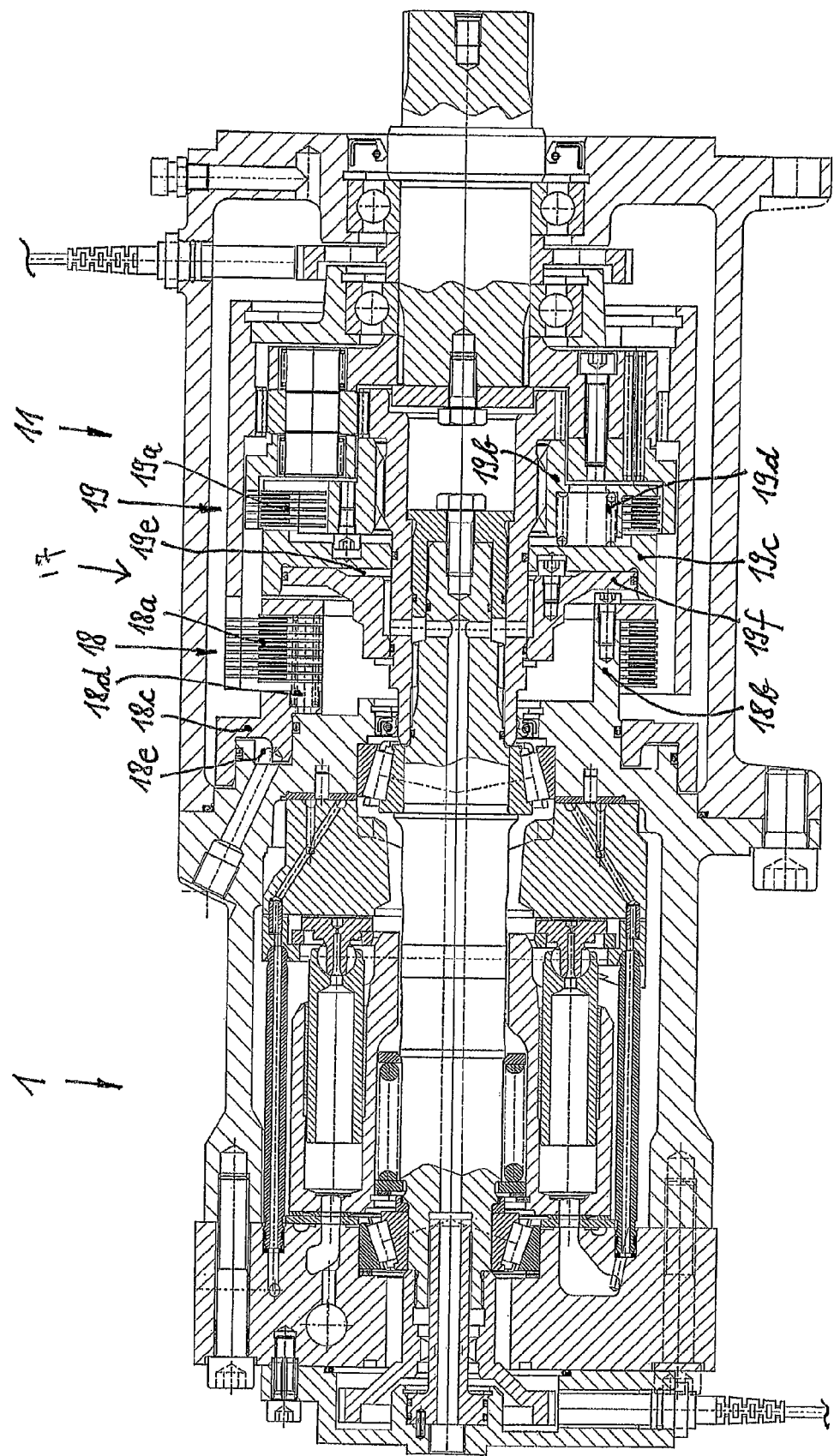
FIG. 3 is a longitudinal section through a second variant of a hydromechanical transmission of the invention.

The variant of the hydromechanical transmission illustrated in FIG. 3 differs from the previous variants in that, in the first multi-plate clutch 18 as well as in the second multi-plate clutch 19 of the gear shifting device 17, the spring mechanism 18d or 19d is effective in the opening direction and thus serves solely to ensure unobstructed movement of the clutch plates 18a or 19a when the shift actuators 18c, 19c effective in the closing direction are not pressurized with oil. Closing the multi-plate clutches 18, 19 thus requires sufficient oil pressure in the pressure control spaces 18e or 19e, respectively. If it is lacking, the multi-step variable speed transmission 11 is then in the neutral position.

Figure 4:
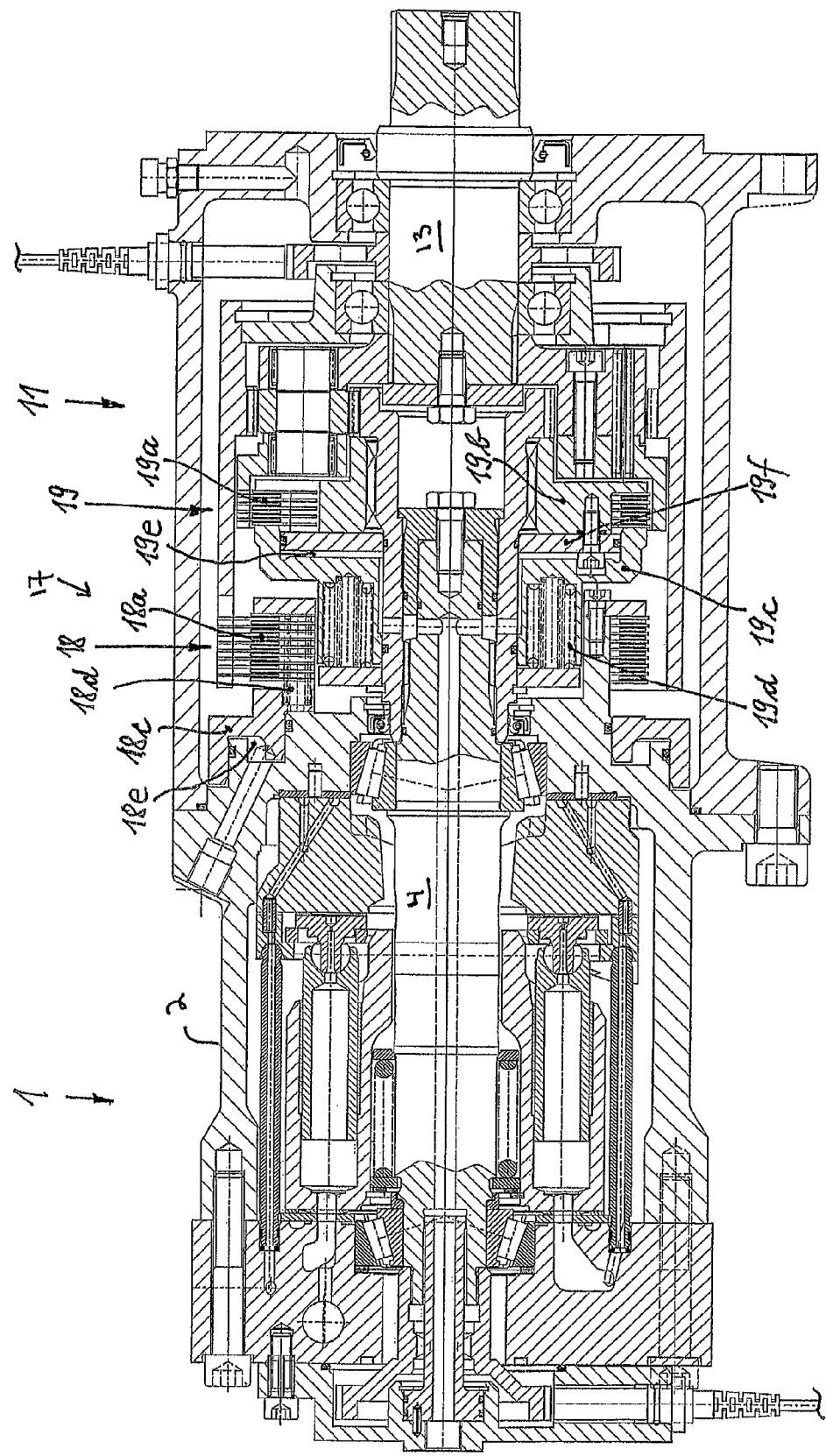
FIG. 4 is a longitudinal section through a third variant of a hydromechanical transmission of the invention.

The multi-step variable speed transmission 11 of the hydromechanical transmission illustrated in FIG. 4 is equipped with a gear shifting device 17 in which only the second multi-plate clutch 19 is equipped with a spring mechanism 19d effective in the closing direction, whereas the spring mechanism 18d of the first multi-plate clutch 18 is effective in the opening direction and accordingly possesses only a relatively slight spring force. An oil pressure failure therefore leads to an operating mode with through-drive (i.e., second gear, which corresponds to the road gear) in which the transmission shaft 13 of the multi-step variable speed transmission 11 is coupled in synchronous rotation with the drive shaft 4 of the hydraulic motor 1 and not immobilized on the motor housing 2.

With the modular design of the gear shifting device 17 illustrated in FIGS. 1 through 4, various fail safes are possible with only a few limited use parts, which become effective when there is no oil pressure.

Figure 5:
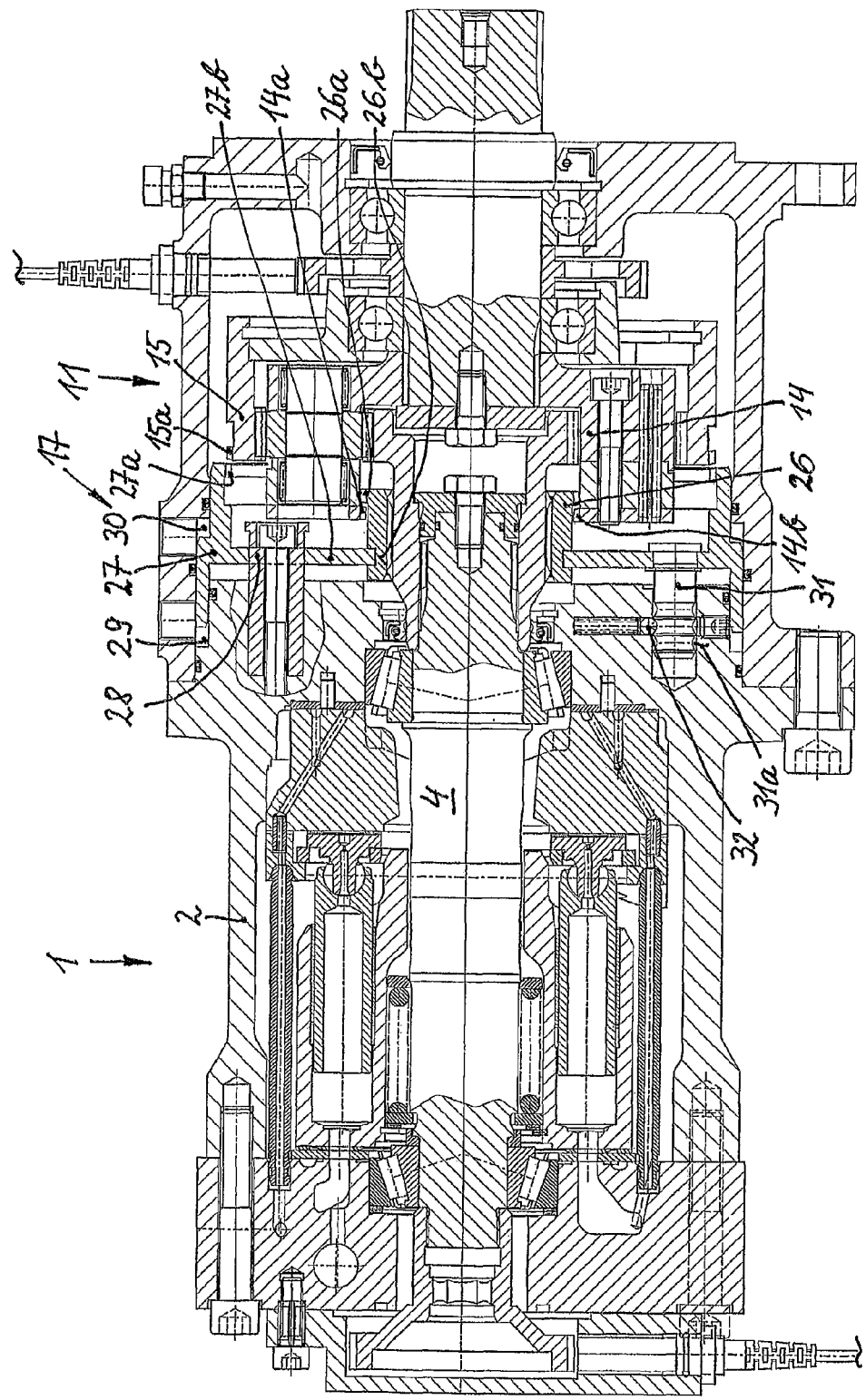
FIG. 5 is a longitudinal section through a fourth variant of a hydromechanical transmission of the invention.

Provision can also be made of switching gear teeth in lieu of multi-plate clutches for torque transmission in the multi-step variable speed transmission 11, as is the case in the variant of embodiment illustrated in FIG. 5. Switching gear teeth 26a are formed on an axially displaceable shift sleeve 26 coupled in a rotationally rigid manner with the drive shaft 4, which can be engaged with switching gear teeth 14b on the planet carrier 14. The shift sleeve 26 is operatively connected to a shift actuator 27, which is held in a rotationally fixed but axially displaceable manner on the motor housing 2 of the hydraulic motor 1. On the shift actuator 27 are formed switching gear teeth 27a that can be engaged with switching gear teeth 15a on the ring gear 15. The ring gear 15 can thus be immobilized relative to the motor housing 2 of the hydraulic motor 1.

Depending on the pressurization in two pressure control spaces 29, 30, the shift actuator 27 is axially displaceable, wherein the axial movement is transferred directly to the shift sleeve 26. To this end an annular groove 26b is formed on the outer diameter of the shift sleeve 26, in which a radial section 27b of the shift actuator 27 radially engages. To secure the shift actuator 27 from turning, several support bolts 28 on which the shift actuator 27 is axially displaceable are inserted on a pitch circle concentric to the drive shaft 4 in the transmission side face of the motor housing 2 of the hydraulic motor 1.

Depending on the oil pressure in the pressure control spaces 29 and 30, which are functionally equivalent to the pressure control spaces 18e and 19e in the variant of embodiment of FIG. 3, three shifting positions are achievable by corresponding axial displacement of the shift actuator 27. In a first shifting position corresponding to neutral and illustrated in FIG. 5, neither the switching gear teeth 26a of the shift sleeve 26 nor the switching gear teeth 27a of the shift actuator 27 are engaged with counter teeth.

In a second shifting position the shift actuator 27 and the shift sleeve 26 coupled therewith are axially displaced into a position (to the right in the figure) in which the switching gear teeth 27a of the rotationally fixed shift actuator 27 engage with the switching gear teeth 15a of the ring gear 15, whereas the switching gear teeth 26a of the shift sleeve 26 and the switching gear teeth 14b of the planet carrier 14 are disengaged. In this shifting position, the reduction step is effective in the planetary gear train, since the ring gear 15 is immobilized relative to the motor housing 2.

In a third shifting position the shift actuator 27 and the shift sleeve 26 coupled therewith are axially displaced into a position (to the left in the figure) in which the switching gear teeth 26a of the shift sleeve 26 engage with the switching gear teeth 14b of the (multi-part) planet carrier 14, whereas the switching gear teeth 27a, 15a of the shift actuator 27 and/or of the ring gear 15 are disengaged. The planetary gear train is thus shifted to through-drive in this shifting position.

In order for the respective shifting position to remain fixed when there is no hydraulic oil pressure in the pressure control spaces 29, 30, the shift actuator 27 is equipped with an arresting bolt 31, which has annular grooves 31a configured to engage with a spring-loaded detent ball 32. This arresting mechanism is integrated in the end face of the motor housing 2 of the hydraulic motor 1.

In contrast to the variants of embodiment of the hydromechanical transmission illustrated in FIGS. 1 to 4, pressurizing medium is supplied to the two pressure control spaces 18e, 19e without an axial channel formed in the drive shaft 4 of the hydraulic motor 1. Nevertheless, supplying the oil turns out to be relatively easy because the necessary supply connections for the pressure control spaces 29, 30 are directly disposed on the hydraulic motor 1.

Figure 6:
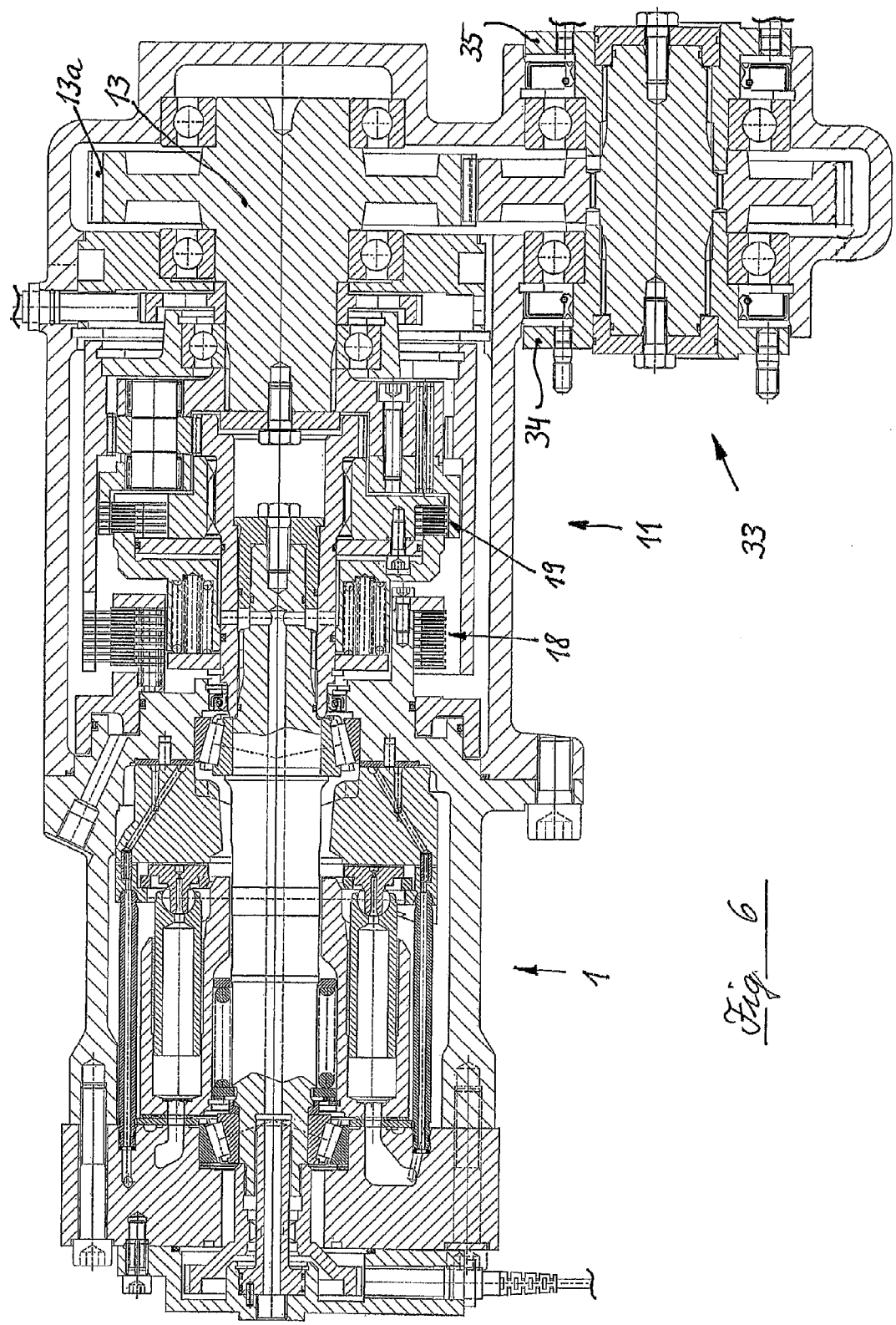
FIG. 6 is a longitudinal section through a fifth variant of a hydromechanical transmission of the invention.

FIG. 6 shows a variant embodiment of the hydromechanical transmission in which the transmission shaft 13 of the multi-step variable speed transmission 11 equipped with multi-plate clutches 18, 19 is connected to, e.g., is integrally formed with, gear 13a, which forms the input of a spur gear stage of a downstream transfer case 33, which is consolidated with the multi-step variable speed transmission 11 into a constructional unit and has two output flanges 34, 35. The hydromechanical transmission can thus be used in the form of an installation kit as a splitter gearbox, wherein it is inserted in the power flow between two drive axles of an all-wheel drive work machine.

Figure 7:
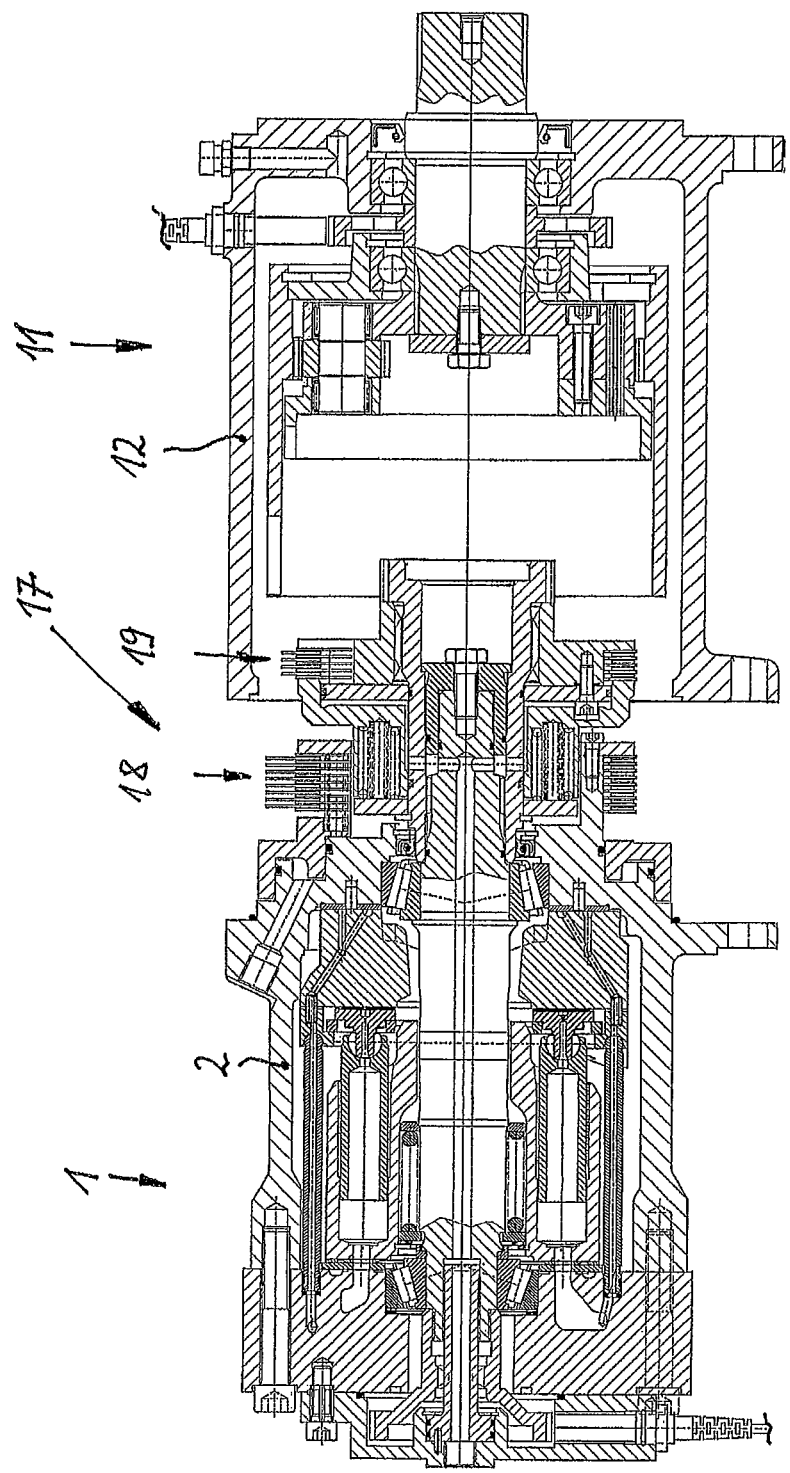
FIG. 7 is an illustration of the assembly of the hydromechanical transmission.

FIG. 7 shows the preassembled constructional unit consisting of the hydraulic motor 1 and the gear shifting device 17 for the embodiment of the hydromechanical transmission illustrated in FIG. 3, in which the gear shifting device 17 is equipped with multi-plate clutches 18, 19 for torque transmission. This constructional unit is connected to the likewise preassembled multi-step variable speed transmission 11 to form a compact transmission, wherein the transmission case 12 then overlaps the gear shifting device 17 held on the hydraulic motor 1 and is bolted to the motor housing 2 of the hydraulic motor 1.

Figure 8:
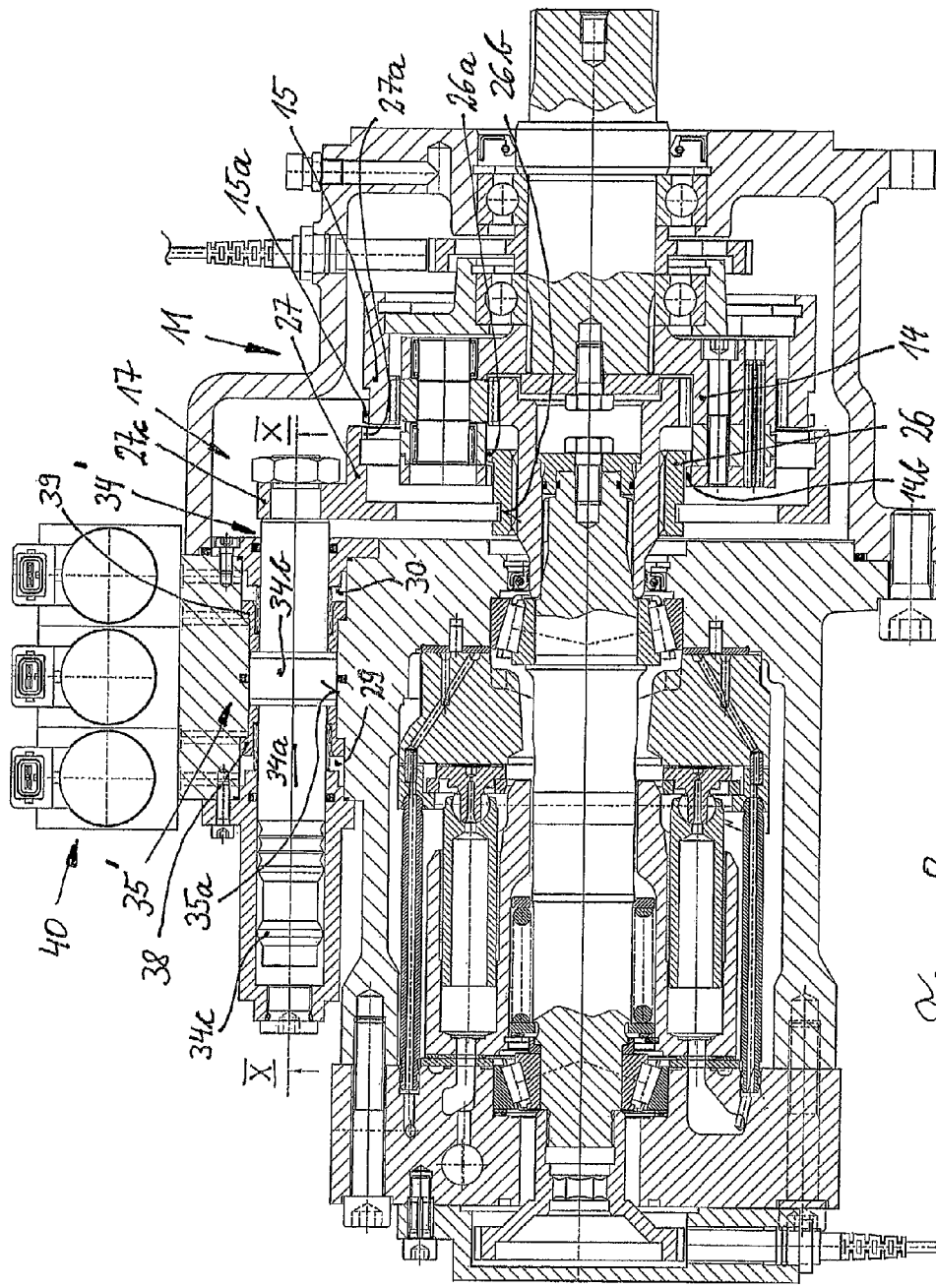
FIG. 8 is a longitudinal section through a sixth variant of a hydromechanical transmission of the invention.
Figure 9:
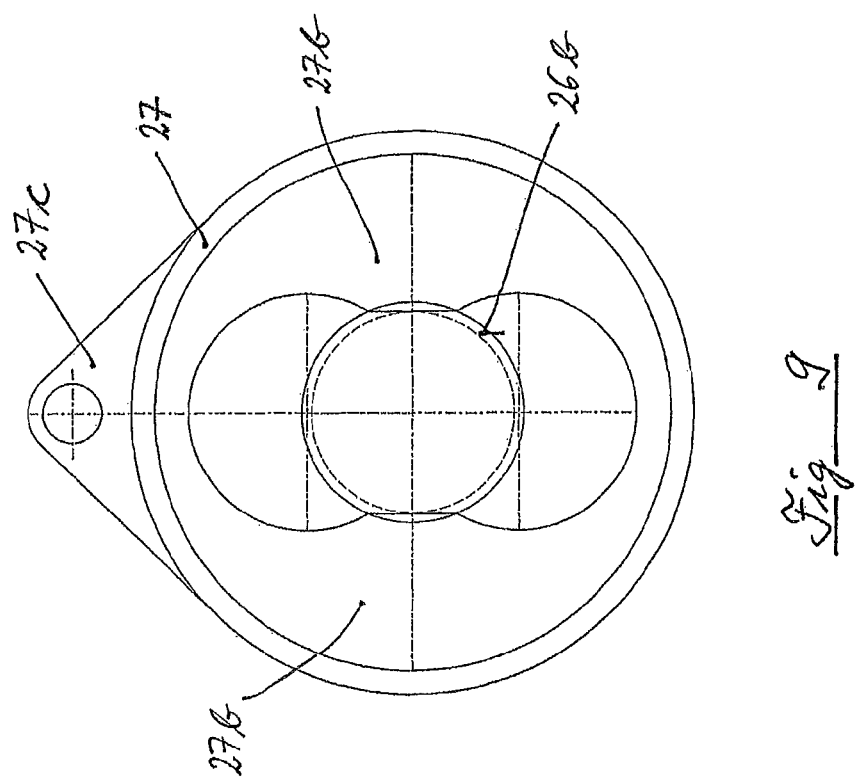
FIG. 9 is a view from above of the shift actuator of the variant of FIG. 8.

FIG. 8 shows a variant embodiment of the hydromechanical transmission in which, analogously to the variant of FIG. 5, provision is made of switching gear teeth for torque transmission in the multi-step variable speed transmission 11. The gear shifting device 17 differs only in terms of the shift actuator 27 operatively connected to the shift sleeve 26. The latter is indirectly rather than directly hydraulically actuable. To this end, the shift actuator 27 is connected on an outer radial extension 27c (also see FIG. 9) to an actuator piston 34' of a shift cylinder 35' connected to (e.g., integrally formed on) the motor housing 2 of the hydraulic motor 1. The hydraulically actuable, axially displaceable actuator piston 34' thus serves as an element that moves the shift actuator 27 back and forth as well as an anti-torsion means, i.e., as a torque support on which, in the shifting position corresponding to the working gear, the ring gear 15 of the planetary gear train is supported on the hydraulic motor 1 by the switching gear teeth 15a of the ring gear 15 and the switching gear teeth 27a of the shift actuator 27.

Figure 10:
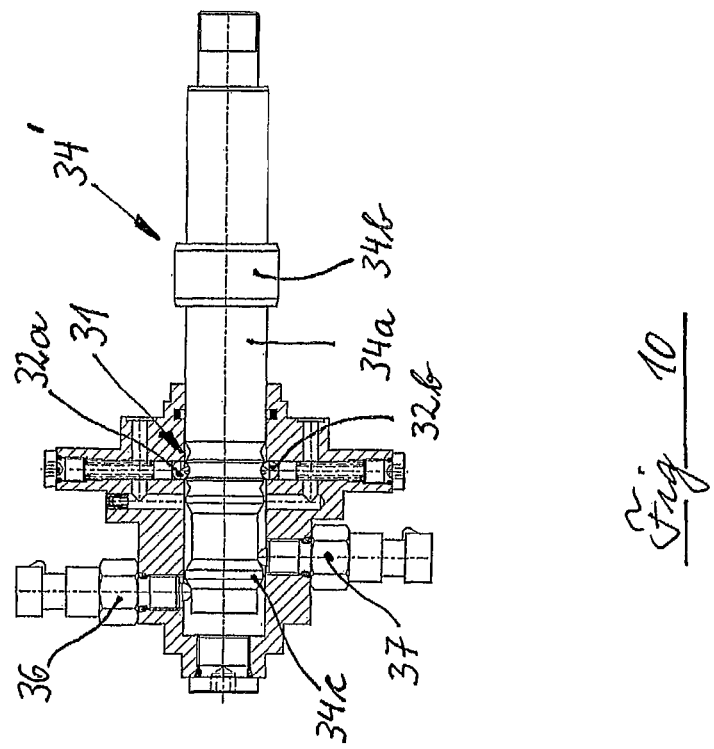
FIG. 10 is a section along the line x-x in FIG. 8.

The actuator piston 34' is equipped with a piston rod 34a and a centrally aligned piston section 34b. The end of the piston section 34a remote from the transmission is configured as an arresting bolt 31 (also see FIG. 10) which, analogously to the variant of embodiment of FIG. 5, is configured to engage with spring-loaded detent balls 32a, 32b. The piston rod 34a is equipped with a union 34c adjoining it in the axial direction and interacting with two position switches 36, 37 for relaying the position of the actuator piston 34 and hence the shifting position in the multi-step variable speed transmission 11 to a master control.

Axially displaceable stop bushings 38, 39 with graduated diameters can be positioned against both faces of the piston section 34b, which stop bushings are arranged in a graduated cylinder bore 35a of the actuator piston 34' on both sides of the piston section 34b and can be hydraulically actuated along with the actuator piston 34' by means of a hydraulic valve manifold 40, which controls the oil pressure in two pressure control spaces 29, 30. With the help of the stop bushings 38, 39, the idea is to prevent a direct, i.e., immediate, shifting to and from the working gear and the road gear. More importantly, the actuator piston 34' is always moved briefly into the middle position corresponding to neutral first, in order that a synchronization speed may be set by exerting a corresponding influence on the hydrostatic CVT before the respective next gear is engaged.

For example, if the actuator piston 34' is set to the far left (corresponding to the road gear in the multi-step variable speed transmission 11, in which the shift sleeve 26 and the shift actuator 27 are also in the far left position and the switching gear teeth 26a and 14b are therefore engaged with each other, whereas the switching gear teeth 27a and 15a are disengaged) and if the pressure control space 29 is then pressurized, the stop bushing 38 and the actuator piston 34' are moved to the right. The axial movement of the stop bushing 38 ends at the dedicated step of the cylinder bore 35a.

In order to prevent the actuator piston 34' from moving past the middle position corresponding to neutral in the multi-step variable speed transmission 11, which would be brought about by the oil pressure acting on the annular surface between the piston section 34b and the piston rod 34a, the second pressure control space 30 is also pressurized with oil at the same time as (or immediately after) the first pressure control space 29 so that the stop bushing 39 is in a position in which it acts as an axial stop for the piston section 34b and stops the actuator piston 34'. The multi-step variable speed transmission 11 is thus in neutral and a synchronization speed can be set in the hydrostatic CVT by changing the gear ratio.

When the synchronization speed is set, then the oil pressure in the pressure control space 30 is lowered or eliminated and the actuator piston 34', under the effect of the oil pressure still prevailing in the pressure control space 29, moves farther to the right (in FIG. 8) and thus out of the neutral position into a shifting position that corresponds to the working gear and in which the switching gear teeth 15a of the ring gear 15 engage with the switching gear teeth 27a of the shift actuator 27.

It will be readily appreciated by those skilled in the art that modifications can be made to the invention without departing from the concepts disclosed in the foregoing description. According, the particular embodiments disclosed in detail herein are illustrative only and are not limiting to the scope of the invention, which is to be given the full breadth of the appended claims and all equivalents thereof.

The invention claimed is:

1. A hydromechanical transmission, comprising:
   a hydraulic pump-driven hydraulic motor of a hydrostatic continuously variable transmission; and
   a mechanical multi-step variable speed transmission attached to a drive shaft of the hydraulic motor, which is shifted into operation by a gear shifting device,
   wherein the gear shifting device is arranged directly adjacent to the hydraulic motor and is consolidated therewith into a preassembled constructional unit, and
   wherein the drive shaft has an axial channel which is connected on a transmission side end of the drive shaft to a pressure control space of the gear shifting device.

2. The hydromechanical transmission of claim 1, wherein the gear shifting device is arranged in an area of an axial section of the drive shaft that projects from a drive shaft area axially delimited by two drive shaft bearings arranged at a distance from one another.

3. The hydromechanical transmission of claim 1, wherein the gear shifting device is hydraulically actuable and held on the hydraulic motor.

4. The hydromechanical transmission of claim 3, wherein the gear shifting device has at least one axially displaceable shift actuator which is actuable by oil pressure prevailing in the pressure control space.

5. The hydromechanical transmission of claim 1, wherein the axial channel is connected on an end of the drive shaft remote from the transmission to a rotary feed-through.

6. The hydromechanical transmission of claim 5, wherein the rotary feed-through has a rotationally fixed bushing, which ends in a center bore adjoining the centrally aligned axial channel and is formed in the end face of the drive shaft remote from the transmission in a support area of a drive shaft bearing remote from the transmission.

7. The hydromechanical transmission of claim 1, wherein the multi-step variable speed transmission and the hydraulic motor are combined with one another into a preassembled transmission unit.

8. The hydromechanical transmission of claim 7, wherein the multi-step variable speed transmission has a transmission case enclosing the gear shifting device.

9. The hydromechanical transmission of claim 1, wherein the multi-step variable speed transmission has a one-step planetary gear train, which includes a sun gear, a planet carrier equipped with planet gears, and a ring gear.

10. The hydromechanical transmission of claim 9, wherein the sun gear is radially and axially supported on the drive shaft of the hydraulic motor.

11. The hydromechanical transmission of claim 9, wherein the planet carrier is fastened on a transmission shaft of the multi-step variable speed transmission.

12. The hydromechanical transmission of claim 11, wherein the transmission shaft of the multi-step variable speed transmission is connected to an input side gear of a downstream spur gear stage of a transfer case.

13. The hydromechanical transmission of claim 9, including a multi-plate clutch, which has clutch plates alternatingly coupled with a rotationally fixed component and with the ring gear of the planetary gear train.

14. The hydromechanical transmission of claim 9, the gear shifting device comprising switching gear teeth for torque transmission in the multi-step variable speed transmission.

15. The hydromechanical transmission of claim 14, wherein switching gear teeth are formed in an axially displaceable shift sleeve coupled in synchronous rotation with the drive shaft of the hydraulic motor, which is displaceable by a directly or indirectly hydraulically actuable shift actuator.

16. The hydromechanical transmission of claim 15, wherein the switching gear, teeth of the shift sleeve are engagable with switching gear teeth of the planet carrier.

17. The hydromechanical transmission of claim 16, wherein the shift actuator is held in a rotationally fixed manner and equipped with switching gear teeth capable of being engaged with switching gear teeth of the ring gear.

18. The hydromechanical transmission of claim 15, wherein the shift actuator is operatively connected to an arresting bolt which has annular grooves configured to engage with a spring-loaded detent ball.

19. The hydromechanical transmission of claim 15, wherein the shift actuator is connected to an actuator piston of a hydraulic shift cylinder.

20. The hydromechanical transmission of claim 19, wherein an arresting bolt is connected to the actuator piston.

21. The hydromechanical transmission of claim 19, wherein the actuator piston has a piston rod and a middle piston section enlarged in diameter, which is capable of being operatively connected on each of its end faces with a stop bushing graduated in outer diameter and arranged in a step portion of a cylinder bore of the shift cylinder, said step portion corresponding to the graduation.

22. The hydromechanical transmission of claim 1, including multi-plate clutches for torque transmission in the multi-step variable speed transmission.

23. The hydromechanical transmission of claim 22, including a clutch plate carrier fastened or integrally formed on a motor housing of the hydraulic motor.

24. The hydromechanical transmission of claim 22, including a spring mechanism for actuating a multi-plate clutch in a closing direction.

25. The hydromechanical transmission of claim 22, including a multi-plate clutch that has clutch plates alternatingly coupled with a planet carrier and with a sun gear.

26. The hydromechanical transmission of claim 25, including a spring mechanism for actuating the multi-plate clutch in the closing direction.

27. A hydromechanical transmission, comprising:
   a hydraulic pump-driven hydraulic motor of a hydrostatic continuously variable transmission; and
   a mechanical multi-step variable speed transmission attached to a drive shaft of the hydraulic motor, which is shifted into operation by a gear shifting device, the gear shifting device comprising switching gear teeth for torque transmission in the multi-step variable transmission,
   wherein the gear shifting device is arranged directly adjacent to the hydraulic motor and is consolidated therewith into a preassembled constructional unit,
   wherein the switching gear teeth are formed in an axially displaceable shift sleeve coupled in synchronous rotation with the drive shaft of the hydraulic motor, which is displaceable by a directly or indirectly hydraulically actuable shift actuator, and
   wherein the shift actuator is operatively connected to an arresting bolt which has annular grooves configured to engage with a spring-loaded detent ball.

28. The hydromechanical transmission of claim 27, wherein the gear shifting device is arranged in an area of an axial section of the drive shaft that projects from a drive shaft area axially delimited by two drive shaft bearings arranged at a distance from one another.

29. The hydromechanical transmission of claim 27, wherein the gear shifting device is hydraulically actuable and held on the hydraulic motor.

30. The hydromechanical transmission of claim 27, wherein the multi-step variable speed transmission and the hydraulic motor are combined with one another into a preassembled transmission unit.

31. The hydromechanical transmission of claim 30, wherein the multi-step variable speed transmission has a transmission case enclosing the gear shifting device.

32. The hydromechanical transmission of claim 27, wherein the multi-step variable speed transmission has a one-step planetary gear train, which includes a sun gear, a planet carrier equipped with planet gears, and a ring gear.

33. The hydromechanical transmission of claim 32, wherein the sun gear is radially and axially supported on the drive shaft of the hydraulic motor.

34. The hydromechanical transmission of claim 32, wherein the planet carrier is fastened on a transmission shaft of the multi-step variable speed transmission.

35. The hydromechanical transmission of claim 32, wherein the switching gear teeth of the shift sleeve are engagable with switching gear teeth of the planet carrier.

36. The hydromechanical transmission of claim 35, wherein the shift actuator is held in a rotationally fixed manner and equipped with switching gear teeth capable of being engaged with switching gear teeth of the ring gear.

37. The hydromechanical transmission of claim 27, wherein the shift actuator is connected to an actuator piston of a hydraulic shift cylinder.

38. The hydromechanical transmission of claim 37, wherein the actuator piston has a piston rod and a middle piston section enlarged in diameter, which is capable of being operatively connected on each of its end faces with a stop bushing graduated in outer diameter and arranged in a step portion of a cylinder bore of the shift cylinder, said step portion corresponding to the graduation.

39. A hydromechanical transmission, comprising:
a hydraulic pump-driven hydraulic motor of a hydrostatic continuously variable transmission; and
a mechanical multi-step variable speed transmission attached to a drive shaft of the hydraulic motor, which is shifted into operation by a gear shifting device, the gear shifting device comprising switching gear teeth for torque transmission in the multi-step variable transmission,
wherein the gear shifting device is arranged directly adjacent to the hydraulic motor and is consolidated therewith into a preassembled constructional unit,
wherein switching gear teeth are formed in an axially displaceable shift sleeve coupled in synchronous rotation with the drive shaft of the hydraulic motor, which is displaceable by a directly or indirectly hydraulically actuable shift actuator,
wherein the shift actuator is connected to an actuator piston of a hydraulic shift cylinder, and
wherein the actuator piston has a piston rod and a middle piston section enlarged in diameter, which is capable of being operatively connected on each of its end faces with a stop bushing graduated in outer diameter and arranged in a step portion of a cylinder bore of the shift cylinder, said step portion corresponding to the graduation.

40. The hydromechanical transmission of claim 39, wherein the gear shifting device is arranged in an area of an axial section of the drive shaft that projects from a drive shaft area axially delimited by two drive shaft bearings arranged at a distance from one another.

41. The hydromechanical transmission of claim 39, wherein the gear shifting device is hydraulically actuable and held on the hydraulic motor.

42. The hydromechanical transmission of claim 39, wherein the multi-step variable speed transmission and the hydraulic motor are combined with one another into a preassembled transmission unit.

43. The hydromechanical transmission of claim 42, wherein the multi-step variable speed transmission has a transmission case enclosing the gear shifting device.

44. The hydromechanical transmission of claim 39, wherein the multi-step variable speed transmission has a one-step planetary gear train, which includes a sun gear, a planet carrier equipped with planet gears, and a ring gear.

45. The hydromechanical transmission of claim 44, wherein the sun gear is radially and axially supported on the drive shaft of the hydraulic motor.

46. The hydromechanical transmission of claim 44, wherein the planet carrier is fastened on a transmission shaft of the multi-step variable speed transmission.

47. The hydromechanical transmission of claim 44, wherein the switching gear teeth of the shift sleeve are engagable with switching gear teeth of the planet carrier.

48. The hydromechanical transmission of claim 47, wherein the shift actuator is held in a rotationally fixed manner and equipped with switching gear teeth capable of being engaged with switching gear teeth of the ring gear.

49. The hydromechanical transmission of claim 39, wherein the shift actuator is operatively connected to an arresting bolt which has annular grooves configured to engage with a spring-loaded detent ball.

50. The hydromechanical transmission of claim 39, wherein an arresting bolt is connected to the actuator piston.

51. A hydromechanical transmission, comprising:
a hydraulic pump-driven hydraulic motor of a hydrostatic continuously variable transmission; and
a mechanical multi-step variable speed transmission attached to a drive shaft of the hydraulic motor, which is shifted into operation by a gear shifting device,
wherein the gear shifting device is arranged directly adjacent to the hydraulic motor and is consolidated therewith into a preassembled constructional unit, and
wherein the gear shifting device comprises switching gear teeth configured for torque transmission in the multi-step variable speed transmission.

* * * * *

UNITED STATES PATENT AND TRADEMARK OFFICE
CERTIFICATE OF CORRECTION

| | | |
|---|---|---|
| PATENT NO. | : 8,920,277 B2 | Page 1 of 1 |
| APPLICATION NO. | : 13/422020 | |
| DATED | : December 30, 2014 | |
| INVENTOR(S) | : Bernward Welschof et al. | |

It is certified that error appears in the above-identified patent and that said Letters Patent is hereby corrected as shown below:

In the Claims

Column 12, Line 11, Claim 16, delete "gear," and insert -- gear --

Signed and Sealed this
Twenty-first Day of April, 2015

Michelle K. Lee
*Director of the United States Patent and Trademark Office*